Patented Feb. 23, 1937

2,071,702

UNITED STATES PATENT OFFICE 2,071,702

HYDROXYCARBAZOLE CARBOXYLIC ACID ARYLAMIDES

Friedrich Muth, Leverkusen-I. G. Werk, Germany, assignor to General Aniline Works, Inc., New York, N. Y., a corporation of Delaware No Drawing. Application April 4, 1932, Serial No. 603,208. In Great Britain September 21, 1931

4 Claims. (Cl. 260—46)

The present invention relates to new hydroxycarbazole carboxylic acid arylamides, more particularly it relates to compounds which may be represented by the probable general formula:

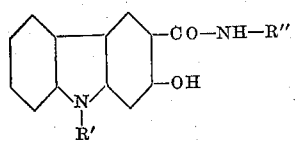

wherein "R'" stands for alkyl or for a hydrocarbon radical of the aromatic or aromatic-aliphatic series, "R''" stands for an aromatic or heterocyclic nucleus, for example for a benzene, naphthalene, indole, carbazole, diphenylenoxide, fluorene and fluorenone nucleus, and wherein all nuclei may be substituted by one or more monovalent substituents, such as halogen, the nitro group, an alkyl group, an acylamino group, an alkoxy group, and an aryloxy group, but with the exception of a group inducing solubility in water, such as the sulfonic acid group, the carboxylic acid group or a hydroxy group. For example, in this formula the figure "R'" may be methyl, ethyl, propyl, butyl, isobutyl, benzyl, 2'-chlorobenzyl, 3',4'-dichlorobenzyl, 4'-nitrobenzyl, phenylethyl, phenyl, 2'-methylphenyl, 4'-methylphenyl, 3'-nitrophenyl, 4'-chlorophenyl, 4'-methoxyphenyl, naphthyl which is attached to the nitrogen atom in α- or β-position, and the figure "R''" may be an aromatic or heterocyclic nucleus of the kind stated above or also radicals of the following types:

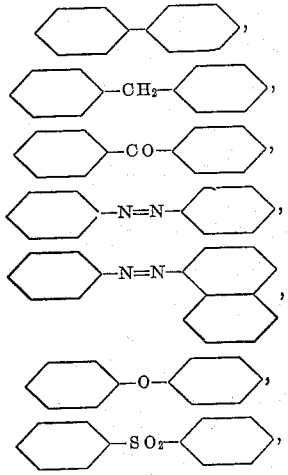

which may bear substituents as do not induce solubility in water, for example, halogen, the nitro group, an alkyl group, an alkoxy group, an aryloxy group and an acylamino group.

My new N-substituted 2-hydroxycarbazole-3-carboxylic acid arylamides are obtainable according to the known methods generally used in the manufacture of compounds of this type, that means, by reacting with the corresponding aromatic or heterocyclic amine upon the acid-chloride or an ester of the corresponding N-substituted 2-hydroxycarbazole-3-carboxylic acid, or by reacting with an arylester of isocyanic acid upon the free N-substituted hydroxycarbazole carboxylic acid, the best method of manufacture being more fully described in the following examples.

The manufacture of the starting N-substituted 2-hydroxycarbazole-3-carboxylic acid has been described in my co-pending application Ser. No. 584,010, filed December 30, 1931, entitled "New hydroxycarbazole compounds".

My new N-substituted 2-hydroxycarbazole-3-carboxylic acid arylamides are generally crystalline white to grey substances, partially soluble in aqueous caustic alkalies, generally soluble in alcoholic caustic alkalies, and are valuable intermediate products for the manufacture of azodyestuffs in substance, on a substratum or on the fibre.

The invention is illustrated by the following examples, without being limited thereto:

*Example 1.*—21, 2 grams of 9-methyl-2-hydroxycarbazole-3-carboxylic acid and 12, 4 grams of p-chloroaniline are dissolved in 500 ccs. of toluene. At a temperature of 60-65° C. there are dropped into the solution 10, 4 grams of phosphorus trichloride in the course of half an hour, while sirring, after this the temperature is raised to boiling in the course of 1 hour and kept for 8 hours at this temperature. The reaction mass is rendered alkaline by the addition of sodium carbonate, any volatile compounds present are distilled off with steam, the precipitate is sucked off, while still warm, and washed with water. From pyridine the arylamide of the formula:

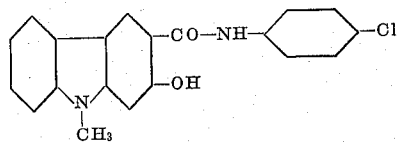

is obtained in form of fine needles of the melting point 277 to 278° C.

In an analogous manner there is obtained:
9-methyl-2-hydroxycarbazole-3-carboxylic acidanilide of the melting point 254° C., 9-methyl-2-hydroxycarbazole-3-carboxylic acid-2'-anisidide of the melting point 188–190° C. and corresponding to the following formula:

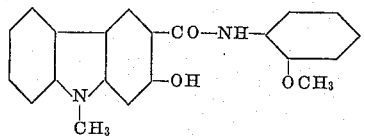

9-methyl-2-hydroxycarbazole-3-carboxylic acid-2'-toluidide of the melting point 193° C., 9-methyl-2-hydroxycarbazole-3-carboxylic acid-2'-methyl-4'-methoxyanilide, 9-methyl-2-hydroxycarbazole-3-carboxylic acid-2'.5'-dimethoxyanilide, 9-methyl-2-hydroxycarbazole-3-carboxylic acid-1'- or 2'-naphthylamide and 9-ethyl-2-hydroxycarbazole-3-carboxylic acid-2'-toluidide of the melting point 187° C. and corresponding to the following formula:

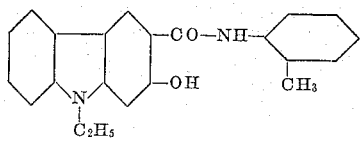

Example 2.—12, 9 grams of 9-methyl-2-hydroxycarbazole-3-carboxylic acid and 10 grams of 1-aminocarbazole are dissolved in 500 ccs. of dimethylaniline. At a temperature of 60–65° C., 5.5 grams of phosphorus trichloride are slowly dropped in, and after this, the reaction mass is slowly heated to 125–130° C. and kept at this temperature for 8 hours. The dimethylaniline is then distilled off with steam, and the residue is purified by successively boiling with aqueous sodium carbonate solution, aqueous caustic soda lye and aqueous hydrochloric acid. The arylide of the formula:

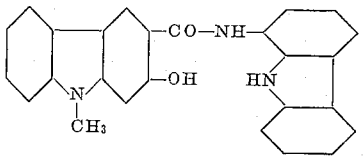

has a melting point above 300° C. It is soluble in alcoholic caustic soda solution.

In an analogous manner there is obtained from 9-methyl-2-hydroxycarbazole-3-carboxylic acid and 2-aminocarbazole the corresponding arylamide having properties similar to those of the arylamide described in paragraph 1 of this example.

The arylamides prepared in an analogous manner from 9-methyl- (or -ethyl-) 2-hydroxycarbazole-3-carboxylic acid and 2-aminodiphenylenoxide are grey, from 2-amino-1-nitrodiphenylenedioxide or 2-amino-fluorenone weakly yellowish colored substances of high melting points, scarcely soluble in aqueous caustic alkalies, soluble in alcoholic caustic alkalies.

The arylamide prepared from 9-phenyl-2-hydroxycarbazole-3-carboxylic acid and o-toluidine has the melting point of 135° C., it is scarcely soluble in aqueous caustic alkalies, soluble in alcoholic caustic alkalies.

The arylamides with aminocarbazoles, diphenyleneoxides, fluorenes or fluorenones are high melting, greyish powders, soluble in alcoholic caustic alkalies.

I claim:

1. Hydroxycarbazole carboxylic acid arylamides of the general formula:

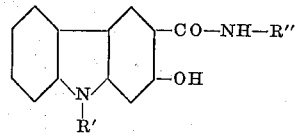

wherein R' stands for a member selected from the group consisting of: alkyl, aralkyl, a radical of the benzene series and a radical of the naphthalene series, and R'' stands for a member selected from the group consisting of: a radical of the benzene-, naphthalene-, carbazole- and indole series, being generally white to grey, crystalline substances, partially soluble in aqueous caustic alkalies, generally soluble in alcoholic caustic alkalies and being valuable intermediate products for the manufacture of azodyestuffs in substance, on a substratum or on the fibre.

2. The arylamide of the following formula:

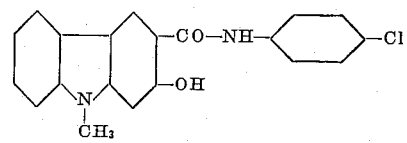

being a crystalline substance of the melting point 277–278° C. and being a valuable intermediate product for the manufacture of azodyestuffs in substance, on a substratum or on the fibre.

3. 9-methyl -2- hydroxycarbazole -3- carboxylic acid-2'-anisidide of the formula:

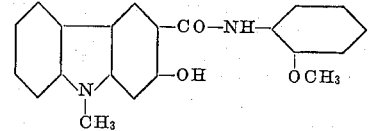

being a crystalline substance of the melting point 188–190° C. and being a valuable intermediate product for the manufacture of azodyestuffs in substance, on a substratum or on the fibre.

4. 9 - ethyl -2- hydroxycarbazole -3- carboxylic acid-2'-toluidide of the formula:

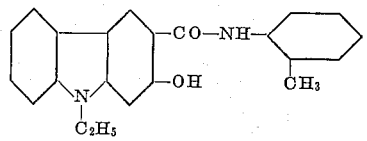

being a crystalline substance of the melting point 187° C. and being a valuable intermediate product for the manufacture of azodyestuffs in substance, on a substratum or on the fibre.

FRIEDRICH MUTH.